United States Patent [19]

Catelli

[11] Patent Number: 5,598,772
[45] Date of Patent: Feb. 4, 1997

[54] DEVICE FOR EXTRACTING JUICE OR PULP FROM FOOD PRODUCE

[75] Inventor: Camillo Catelli, Parma, Italy

[73] Assignee: Rossi & Catelli s.p.A., Parma, Italy

[21] Appl. No.: 578,940

[22] Filed: Dec. 27, 1995

[30] Foreign Application Priority Data

Jan. 10, 1995 [IT] Italy .................. MO95A0003
Jan. 10, 1995 [IT] Italy .................. MO95A0004
Jan. 10, 1995 [IT] Italy .................. MO95A0005

[51] Int. Cl.⁶ .................. A23N 1/00; B30B 9/20
[52] U.S. Cl. .................. 99/510; 99/495; 99/513
[58] Field of Search .................. 99/495, 510–513; 100/117, 127, 144, 219, 375, 405, 781, 784; 209/283; 241/89, 89.3, 100, 287; 366/196, 311, 331; 426/489, 495

[56] References Cited

U.S. PATENT DOCUMENTS

| | | | |
|---|---|---|---|
| 1,320,968 | 11/1919 | Baudendistel | 99/575 |
| 1,366,011 | 1/1921 | Lowe | |
| 2,101,620 | 12/1937 | Lewis | 99/513 |
| 2,246,641 | 8/1941 | Spino | |
| 2,477,620 | 8/1949 | Kerr | |
| 2,630,849 | 3/1953 | Williams | 99/504 |
| 2,811,996 | 11/1957 | Castellanos | 99/513 |
| 4,095,517 | 6/1978 | Janovtchik | |
| 4,545,879 | 10/1985 | Catelli | 99/516 X |
| 4,774,097 | 9/1988 | Bushman et al. | |
| 4,809,595 | 3/1989 | Catelli | 99/510 |
| 4,873,106 | 10/1989 | Kolodesh et al. | 426/481 |
| 4,885,182 | 12/1989 | Kolodesh et al. | 426/482 |
| 4,924,770 | 5/1990 | Raub | 99/511 |
| 5,322,368 | 6/1994 | Tanaka et al. | 99/348 X |
| 5,359,926 | 11/1994 | Sassi | 99/510 |

FOREIGN PATENT DOCUMENTS

| | | |
|---|---|---|
| 2338656 | 8/1977 | France . |
| 2473275 | 7/1981 | France . |
| 1567014 | 5/1980 | United Kingdom . |

Primary Examiner—Timothy F. Simone
Attorney, Agent, or Firm—Browdy and Neimark

[57] ABSTRACT

The invention relates to a device for extracting juice or pulp from food produce. It is particularly useful in the food conserves industry for separating the juice or pulp of fruit and vegetables from the skins and seeds. A tubular strain, provided with an inlet and a discharge outlet for refuse by-products, has at its centre a shaft bearing a plurality of spatulas, each of which has an extremity set very close to a surface of the strain; each of the spatulas bears at its peripheral end a plate made of a hard material, which projects radially from the main body and delimit a free zone between the front face and the peripheral extremity of the spatula. The tubular strain exhibits holes which are of progressively or step-by-step diminishing diameter, going from the inlet to the discharge outlet, and also exhibits an annular support which surrounds the strain.

19 Claims, 5 Drawing Sheets

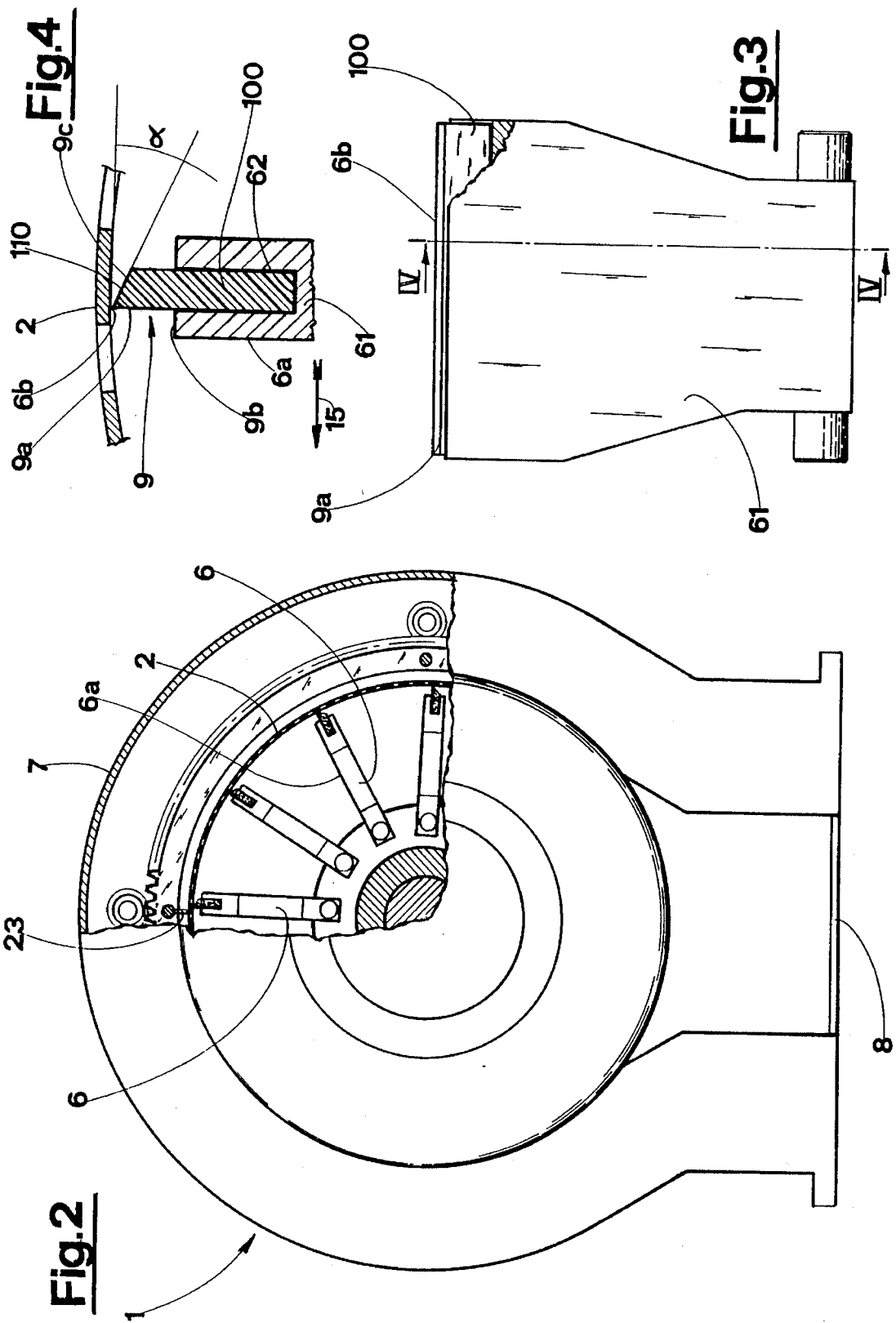

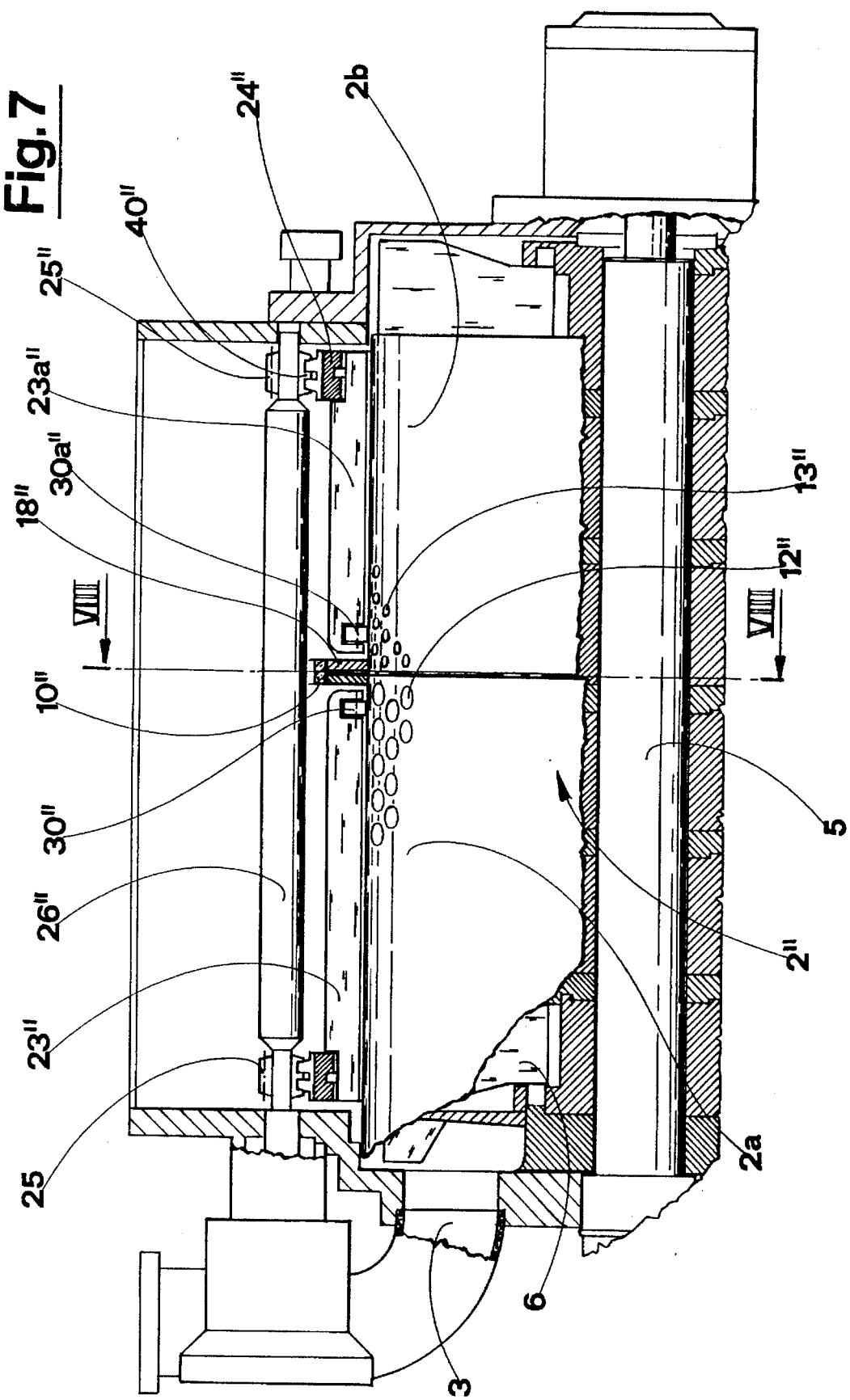

5,598,772

DEVICE FOR EXTRACTING JUICE OR PULP FROM FOOD PRODUCE

BACKGROUND OF THE INVENTION

1. Technical Field of the Invention

Specifically, though not exclusively, the device of the invention is usefully employed in the conserves industry for separating juice or pulp of fruit or vegetables from their skins, seeds and other waste.

The device comprises a tubular strain, provided with an inlet for the produce to be treated, and a discharge outlet for the refuse generated during treatment, at the centre of which, extending from the inlet to the discharge outlet, is situated a rotatable shaft which can be rotated on command. The shaft radially bears a plurality of spatulas, each of which terminates very close to the surface of the strain and moves the produce to be treated centrifugally, pressing it against the strain; the refuse is also nudged towards the discharge outlet. The device also comprises a cover, surrounding the discharge shaft, which is provided with an outlet mouth for the extracted juice or pulp.

2. Prior Art

The prior art teaches devices of this type; an example is described in Italian patent application no. 67132A/77.

One of the disadvantages of known devices is that between strain and spatulas there exists a danger of crushing seeds and skins of produce, resulting in a freeing of bitter tastes which can affect the quality of the finished product.

A further drawback is reduced productivity, that is, a reduced quantity of extracted product per unit of time in relation to power utilized and size of the device used.

A further drawback is that the spatulas wear out quickly and have therefore to be frequently substituted.

A still further drawback in known devices is that the strain, which is fine and slim, cannot be very long as it would deform, which leads to limited potential production of the device.

A still further drawback in known devices is represented by the fact that the strain is subjected to considerable mechanical stress due to the large mass of produce rotating at high speed.

SUMMARY OF THE INVENTION

The main aim of the present invention is to obviate the above-mentioned drawbacks in the known art by providing a device, constructionally simple and economical, which improves the quality of the extracted product, which is highly productive and which is subject, in relation to the quantity of produce treated, to only modest mechanical stress. An advantage of the invention is that it reduces costs and inoperative times for the substitution of the spatulas.

A further advantage is that it eliminates the risk of crushing seeds and skins.

A still further advantage is that it reduces mechanical stress, especially on the spatulas and the strain.

A still further advantage of the invention is that the strains can be easily and rapidly dismounted from the device.

A still further advantage of the invention is that differentiated peripheral velocities of treatment can be achieved, without changing the spatulas.

These aims and advantages and others besides are all attained by the device in question, as it is set out in the accompanying claims.

BRIEF DESCRIPTION OF THE DRAWINGS

Further characteristics and advantages of the present invention will better emerge from the detailed description that follows, of some embodiments of the invention, illustrated in the form of non-limiting examples in the accompanying drawings, in which:

FIG. 2 is a lateral view from the right of FIG. 1, with some parts removed better to evidence others;

FIG. 3 is a detail of FIG. 1 in enlarged scale;

FIG. 4 is an enlarged scale illustration of section according to line IV—IV of FIG. 3;

FIG. 7 is an enlarged scale view of a detail of FIG. 6;

DESCRIPTION OF THE PREFERRED EMBODIMENTS

Figure 1:
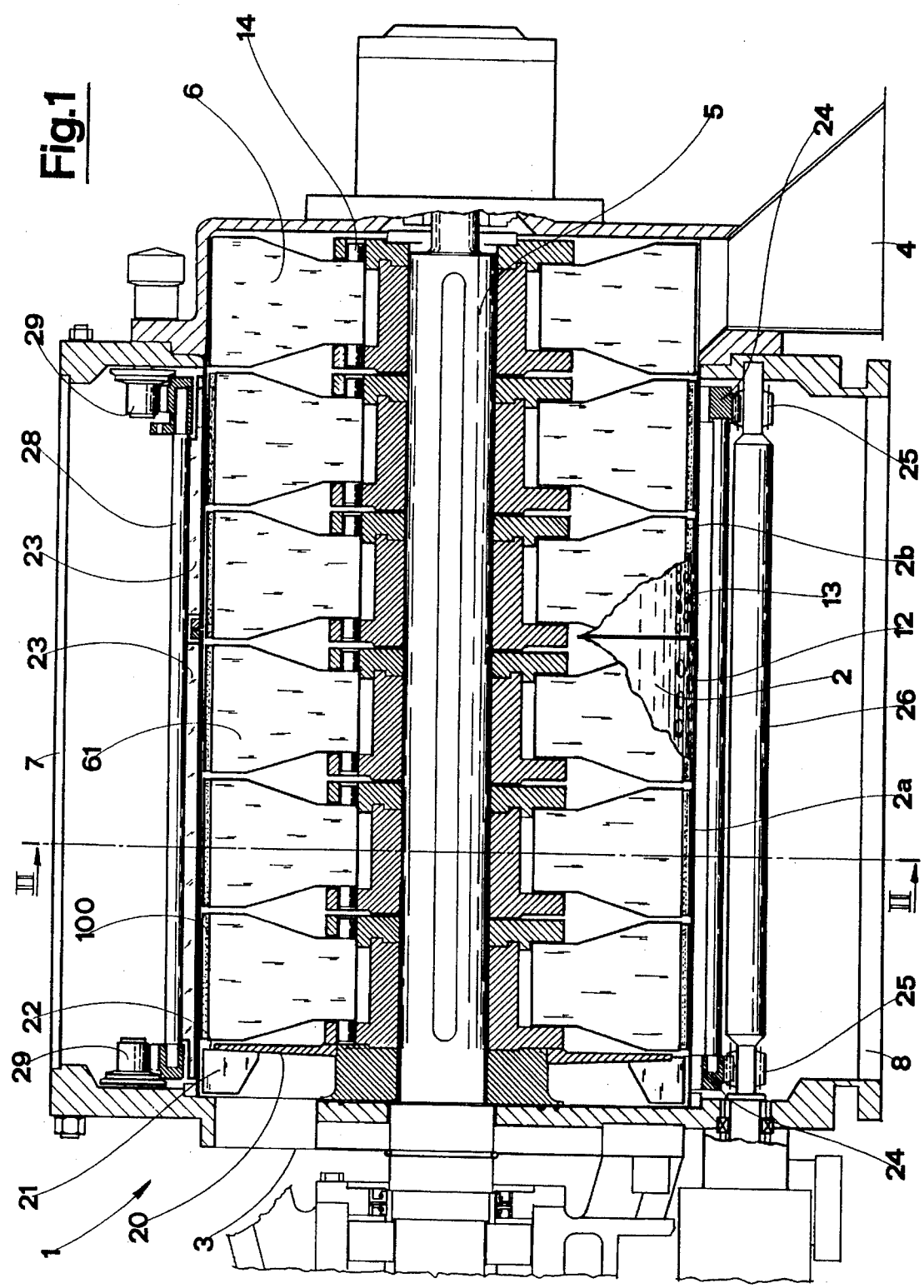
FIG. 1 is a partially sectioned vertical elevation of a first embodiment of the invention.

With reference to the figures of the drawings, 1 denotes in its entirety a device for extracting juice or pulp from food produce which, in all embodiments, comprises a tubular strain 2 2' 2" provided with an inlet 3 for the produce to be treated and a discharge outlet 4 for the refuse produced during treatment.

A casing 7 surrounds the strain 2 and is provided with an outlet 8 for the extracted product.

A rotatable shaft 5 is situated between the inlet 3 and the discharge outlet 4, which shaft 5 bears a plurality of radial spatulas 6.

As shown in FIG. 4, each of the spatulas 6 is mounted on the shaft 5 by means of a cylindrical joint 14 which allows the spatulas 6 to oscillate up to a predetermined degree with respect to the rotatable shaft 5. Each of the spatulas 6 terminates very close to the surface of the tubular strain 2 2' 2", and has a free zone 9 between the front face 6a of the spatula (with reference to the rotation direction thereof, indicated by an arrow 15 in the figures) and the peripheral extremity 6b.

The free zone 9 is delimited, in the example, by a first surface 9a and a second surface 9b, said first surface 9a extending in breadth radially and said second surface 9b extending circumferentially.

Each of the spatulas 6 comprises a main body 61, affording a slot 62, housing a plate 100 made of hard resistent material, such as tungsten carbide, high-speed steel or the like, which projects radially from the peripheral extremity of the main body 61.

Each plate 100 is fixed to the main body 61, for example by means of rivets or welding.

The plate 100 constitutes the peripheral extremity 6b of the spatula 6 and said first surface 9a; the peripheral extremity 6b of the spatula 6 also exhibits a posterior surface 110 inclined with respect to the strain. The peripheral extremity 6b of each of the spatulas 6 therefore is corner-shaped, formed by the first radial surface 9a and the inclined posterior surface 110; the angle of inclination alpha of the posterior surface 110 with respect to the strain is about 10 degrees. The device further comprises a radial shield 20 arranged immediately downstream of the inlet 3. The radial shield 20 is provided with peripheral blades 21, is solidly constrained to the rotatable shaft B and affords an annular peripheral passage zone 22 for the produce.

Thus the produce can transit towards the spatulas 6 only through the passage zone 22.

The strain exhibits holes 12, 12', 12" and 13, 13', 13" of progressively decreasing diameter going from the inlet 3 to the discharge outlet 4.

A single strain 2 can be provided, in which a first portion 2a, close to the inlet 3, is provided with holes 12 having a greater diameter with respect to holes 13 of a second portion of the same strain 2, close to the discharge outlet 4.

In this case, a scraper knife 23 is provided, arranged on the external surface of the strain and rotatable with respect thereto.

The scraper knife 23 is supported by a pair of cogrings 24 set in rotation by means of pinions 26 and a small rotating shaft 26.

The cogrings 24 are held in position by pivots 28 disposed parallel to an axis of rotation of said cogrings 24, and by idle pinions 29 arranged externally of the cogrings 24. One of the pivots 28 bears the scraper knife 23. This embodiment is not specifically illustrated but can easily be deduced from FIG. 1 (conserving the numbers of the various elements) by imagining portions 2a and 2b to be united to make a single strain 2 and the portions of the scraper knife 23 to be united to make a single scraper knife 23.

In the first embodiment, illustrated in FIGS. 1, 2, 3 and 4, the tubular strain 2 is divided into two portions, 2a and 2b; the first portion 2a, close to the inlet 3, affords holes 12 having a greater diameter than the holes 13 of the second portion 2b, close to the discharge outlet 4. In this embodiment, the scraper knife 23 is divided into two portions and the pivot 28 supporting the scraper knife 23 can be rotated about its axis to bring the scraper knife 23 into a diametrically opposite position to the one illustrated, thus enabling the strain to be dismounted from the posterior portion (right) of the device.

Figure 6:
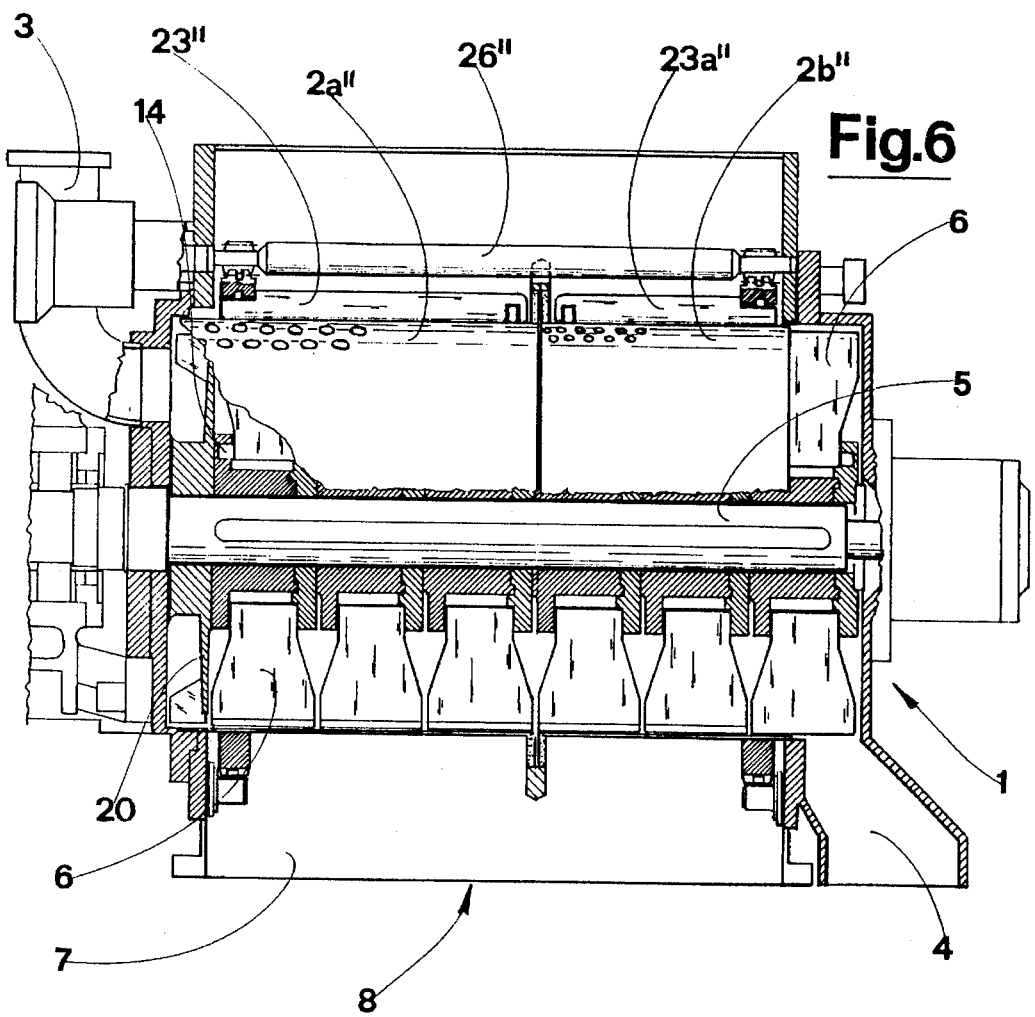
FIG. 6 is a partially-sectioned vertical elevation of a third embodiment of the device.
Figure 8:
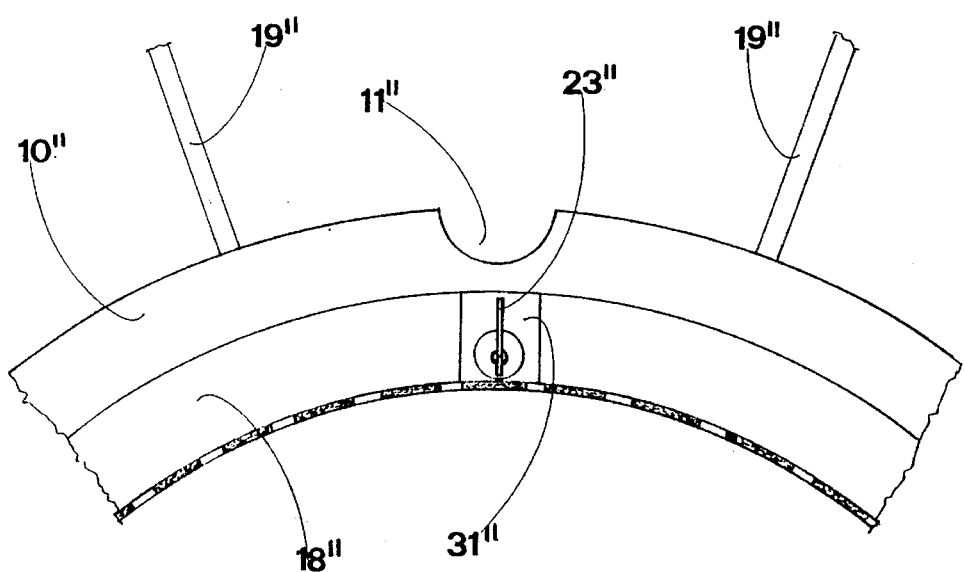
FIG. 8 is an enlarge scale view of a section of a detail of FIG. 7, according to line VIII—VIII.

In a third embodiment, illustrated in FIGS. 6, 7, 8, the strain 2", is divided into two coaxial portions 2a", 2b", of a same diameter and connected to each other by means of a radial flange 18".

A fixed annular support 10" surrounds the strain 2" externally in the conjunction zone of the portions 2a" and 2b", that is at the flange 18' and coaxially thereto. The annular support 10" is solidly constrained to the casing 7 by means of tie bars 19". Also in this embodiment the strain 2" exhibits holes 12", 13", which progressively decrease or decrease step-by-step in diameter in a direction going from the inlet 3 to the discharge outlet 4.

Two scraper knives 23", 23a", are alignedly arranged on the external surface of the strain 2", separated by the flange 18" and the annular support 10", and rotate with respect to the strain.

The scraper knives 23" and 23a" are supported, each by an extremity, by a ring of a pair of cogrings 24" set in rotation, by means of pinions 25", by a single shaft 26".

The cogs of the cogrings 24" are crossed by an annular discharge channel 40"; in this way the cogged couplings can be automatically and continuously cleaned.

The annular support 10" is provided with a recess 11' which allows passage of said shaft 26".

An idle support roller 30", 30a", is connected to the free end of each of the scraper knives 23", 23a".

A notch 31" is made in the flange 18", which notch 31" extends radially from the external surface of the strain to a height which is slightly greater than the height of the scraper knife 23a", enabling easy withdrawal of the portion 2a" of the strain.

In this embodiment too the strain could consist of a single part. In this case the two scraper knives 23" and 23a" are supported by the annular support encircling the strain and not by the flange, which obviously is no longer present.

Several annular supports might be provided, coaxial and appropriately distanced one from a next.

Figure 5:
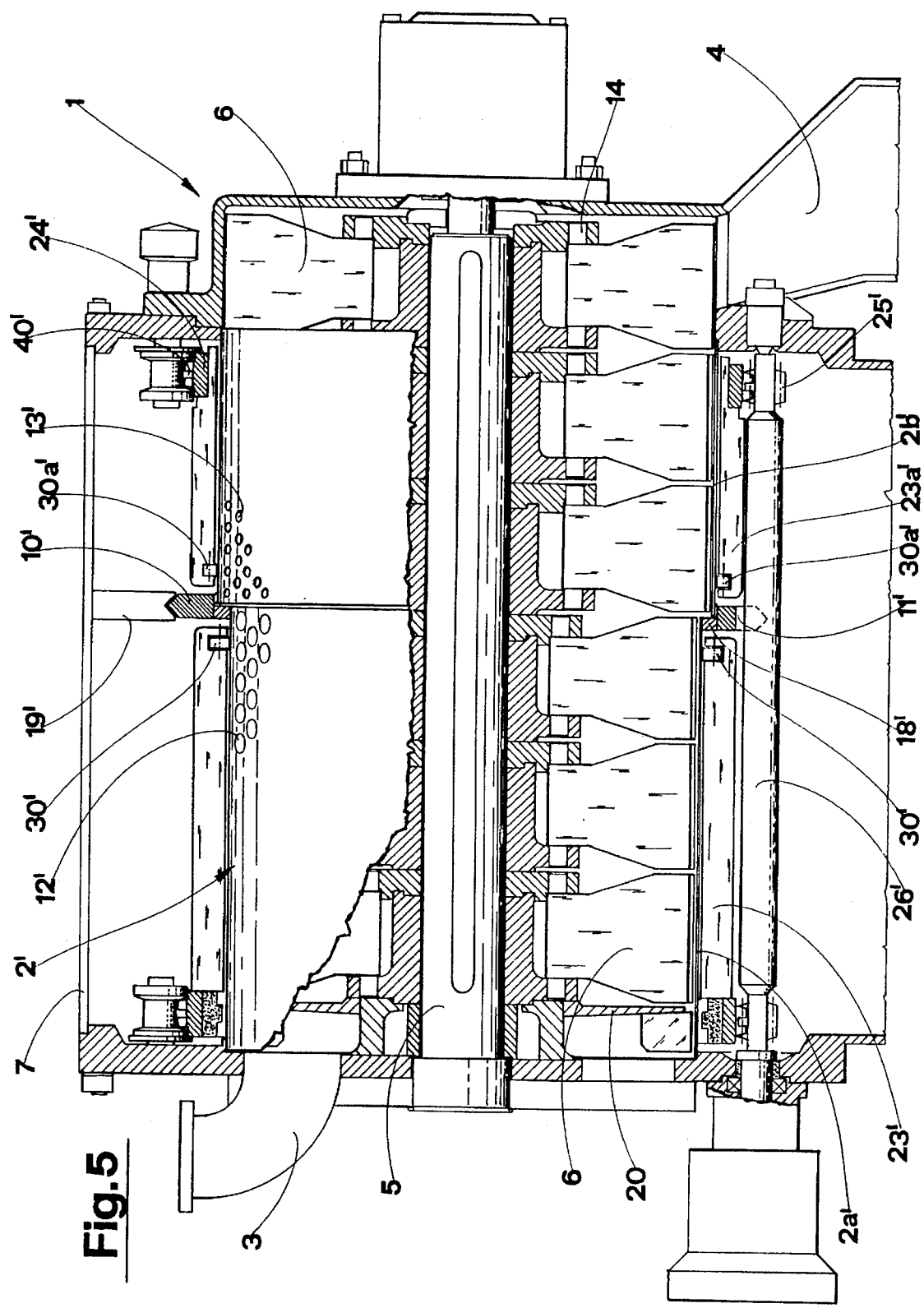
FIG. 5 is a partially-sectioned vertical elevation of a second embodiment of the device.

In a second embodiment, illustrated in FIG. 5, the strain 2' is divided into two coaxial parts 2a' and 2b', connected one to the other by means of a radial flange 18'. In the device illustrated in FIG. 5, the connection between the parts of the strain is achieved simply by pressing the relative flanges made on the two parts thereof one against the other.

In this embodiment part 2b', which is arranged at the discharge outlet 4 end of the device, has a greater diameter than part 2a', which is arranged towards the inlet 3 end of the device. Evidently in this embodiment the spatulas 6 provided on part 2b' will be longer than the spatulas 6 on part 2a', in order that their extremities which are unconnected to the rotatable shaft 5 remain very close to the internal surface of the strain.

In the interest of keeping all the spatulas 6 identical, with evident constructional and maintenance advantages, the greater height as mentioned above can be obtained by adjusting the distance of the fulcrum of the spatulas 6 with respect to the rotatable shaft 5 axis.

In this embodiment too a fixed annular support 10' externally surrounds the strain 2' in the connection zone between its two parts 2a' and 2b', that is, at the flange 18' and coaxially thereto. The annular support is solidly constrained to the casing 7 by means of tie bars 19'.

In this embodiment too the strain exhibits holes 12', 13', which are of progressively or step-by-step decreasing diameter, going from the inlet 3 to the discharge outlet 4. The holes of part 2a' have a greater diameter with respect to the holes of part 2b'.

Two scraper knives 23' and 23a', are arranged on the external surface of the strain 2', separate from the flange 18' and the annular support 10' and rotating with respect to the strain.

The scraper knives 23' and 23a', are supported, each by an extremity, by a ring of a pair of cogrings 24' rotated by means of pinions 25' by a single shaft 26'.

In this embodiment too, the cogs of the cogrings 24' are crossed by an annular discharge channel 40'.

The annular support 10' is provided with a recess 11' which affords passage of said shaft 26'.

An idle support roller 30, 30a, is connected to the free end of each of the scraper knives 23', 23a'.

This second embodiment of the device exhibits the further considerable advantage of imparting a greater peripheral velocity on the produce at the second portion of the strain.

In this zone the produce is lighter and more fibrous and its mass is smaller as a large portion of the liquid has already exited through the holes of the first portion of the strain. In this way greater device productivity is obtained, thanks to the greater peripheral velocity impressed on the "lighter" part of the produce, while mechanical stress on the strain is not increased, as the "liquid and heavy" part of the produce, which is more easily expelled from the strain as it is full of liquids, rotates at a slower peripheral speed. The functioning of the device, similar to that of known devices, is as follows: the shaft is rotated so that the spatulas 6 rotate the produce imparting thereof a centrifugal effect, pressing it against the strain, causing it to exit through the holes; at the same time the motion of the spatulas 6 pushes the waste material towards the discharge outlet 4.

The special characteristics of the extremities of the spatulas 6 improve the quality of the extracted product and favour optimal passage of the juice and pulp through the holes of the strain. Risk of strain blockage is considerably reduced, as the is risk of crushing seeds and skin. Tests have revealed that the load bearing on the spatulas 6 and the strain are also reduced. The above advantages are especially obtained where the angle of inclination alpha is comprised between 8 and 15 degrees.

The use of a plate made of hard and resistant material means that the machine can be used at optimum productivity speed for a considerable length of time, independently of the shape of the plate itself.

The presence of the radial shield 20, which forces the product to enter a circular peripheral crown whereat the centrifugal force imparted by the motion of the blades increases, so does the productivity of the device since the action of the blades is utilized over the entire circumference.

The characteristics of the strain holes, apart from leading to an improvement in the final extracted product, contribute to high machine productivity as the product, in the zone where the holes have a greater diameter, exits more easily and with smaller energy expenditure without leading to a drop in product quality, since said zone is arranged near the inlet 3 of the device where the produce is more fluid.

In tomato working, the presence of small holes in the terminal zone of the strain, where the product is dryer, considerably diminishes the risk of the peel and the seeds being crushed and passing through the strain; in this way the bitter-tasting substance, contained in the peel and seeds, does not pass through the strain and lower the quality of the product, The presence of the annular support 1 ends greater strength to the device as well as rendering it scarcely deformable. In particular, a strain of considerable length can be used, which will also be of a sufficient flexional resistance. This considerably improves the productivity of the device.

The device can be simply and rapidly dismounted. It is especially easy to substitute the strain, an operation which occurs quite frequently during functioning of the device. The operation takes place with the device at a high temperature. In the third embodiment the scraper knives are first brought to the position of the notch 31" before the strain is removed (with movement from left to right, with reference to FIG. 7), passing it over the knives 23a" through the notch 31". Thanks to this procedure, the flange does not obstruct the removal of the strain. If the strain is made of more than one portion, only the portion near the discharge outlet 4 need be frequently substituted, as it is the portion most susceptible to blocking; thus maintenance times can be cut to a minimum.

In the second embodiment the device is dismounted simply and quickly, especially portion 2b' of the strain, which is the portion which gets obstructed more easily and therefore has to be substituted more often. To dismount portion 2a' of the strain, which needs to be dismounted less frequently, a part of the rotor has to be dismounted.

It is evident that the various characteristics described can be used as a group or in part, and can be variously combined according to the type of product being worked or the work performance required of the device.

What is claimed:

1. A device for extracting juice or pulp from food produce, comprising:
   a tubular strain provided with an inlet for a produce to be treated and a first outlet for discharge of waste material, a first rotatable shaft bearing a plurality of spatulas located coaxially with said tubular strain and extending from the inlet to the first outlet, an extremity of each of the plurality of spatulas situated close to a surface of said strain;
   a casing surrounding said strain provided with a second outlet for a product extracted from said produce;
   wherein said strain is provided with holes having a progressively or step-by-step diminishing diameter going from said inlet to said first outlet.

2. The device of claim 1, comprising a single strain which is composed of a first portion, situated close to said inlet, and a second portion, situated close to the first outlet; holes provided in said first portion being of a larger diameter than holes provided in said second portion.

3. The device of claim 2, comprising a scraper knife arranged on an external surface of said strain and rotatable with respect thereto.

4. The device of claim 3, wherein said scraper knife is supported by a pair of cogrings set in rotation, by means of pinions on a second rotatable shaft.

5. The device of claim 1, comprising at least one annular support externally surrounding said strain.

6. The device of cl aim 5, wherein said strain is divided into a first part and a second part, the first part and the second part being coaxial and interconnected by means of a radial flange; said annular support surrounding said strain at a position corresponding to a location of said radial flange.

7. The device of claim 6, wherein: said second part of said strain being arranged near said first outlet and having a diameter which is greater than a diameter exhibited by said first part, said first part being arranged near said inlet.

8. The device of claim 6, comprising two scraper knives arranged on said external surface of the strain and separated from said flange and said annular support and rotatable with respect to said strain.

9. The device of claim 8, wherein a first end of each of the scraper knives is supported by a ring of a pair of cogrings, said pair of cogrings being set in rotation by means of pinions on a single rotating shaft; the annular support affording a recess enabling passage of said shaft.

10. The device of claim 9, wherein an idle support roller is connected to a second end of each of the scraper knives.

11. The device of claim 8, wherein said flange is provided with a notch which develops radially from the external surface of the strain by a height which is slightly above that of the scraper knife enabling the strain to slide with respect to said scraper knife.

12. The device of claim 9, wherein said cogrings bear teeth which are crossed by an annular discharge channel.

13. The device of claim 1, wherein each of the plurality of spatulas is provided with a free zone situated between a front face with respect to an advancement direction of the plurality of spatulas and a peripheral extremity thereof, which free zone is deli mi ted by a first surface extending radially and a second surface contiguous to the first surface extending circumferentially; said first surface being made of a hard resistant material.

14. The device of claim 13, wherein each of said spatulas comprises a main body, a slot on a peripheral extremity of said main body for engaging a plate made of a hard resistant material, said plate fixed in said slot and radially projecting from said main body; said plate delimiting the peripheral extremity of the spatulas and said first surface.

15. The device of claim 14, wherein said peripheral extremity of each of the spatulas is delimited on said plate by said first surface and by a posterior surface which is inclined with respect to the strain.

16. The device of claim 1, comprising a radial shield situated immediately downstream of said inlet and being provided with peripheral blades, said radial shield being solidly keyed on said rotatable shaft said radial shield delimiting an annular peripheral passage zone for the product.

17. The device of claim 1, wherein each of the plurality of spatulas is provided with a free zone, situated between a front face of each of the spatulas and a peripheral extremity thereof, which free zone is composed of a first surface, extending breadthwise radially, and a second surface, contiguous to the first surface and extending breadthwise circumferentially; each of the spatulas comprising a main body a slot on a peripheral extremity of said main body engaging a plate made of a hard resistant material, said plate projecting radially from the main body; said plate constituting the peripheral and of each of the spatulas and said first surface; said peripheral end of each of the spatulas being delimited on the plate by said first surface and a posterior surface which is inclined with respect to the strain; said device having a radial shield, situated immediately downstream of said inlet, provided with peripheral blades and defining an annular peripheral passage zone for the product; said device further comprising at least one scraper knife arranged on the external surface of the strain and rotating with respect to the strain; and an annular support which externally surround said strain.

18. A device for extracting juice or pulp from food produce, comprising:

a tubular strain provided with an inlet for a produce to be treated and a first outlet for discharge of waste material, a first rotatable shaft bearing a plurality of spatulas located coaxially with said tubular strain and extending from the inlet to the first outlet, each of the plurality of spatulas situated close to a surface of said strain; a casing surrounding said strain provided with a second outlet for a product extracted from said produce;

and at least one annular support which externally surrounds said strain.

19. A device for extracting juice or pulp from food produce, comprising:

a tubular strain, provided with an inlet for a produce to be treated and a first outlet for discharge of waste material produced during treatment, a first rotatable shaft bearing a plurality of spatulas located coaxially with said tubular strain and extending from the inlet to the first outlet, each of the plurality of spatulas terminating at a position which is situated close to a surface of said strain;

a casing surrounding said strain which is provided with a second outlet for a product extracted from said produce;

wherein each of said plurality of spatulas is provided with a free zone situated between a front face of the spatula with respect to an advancement direction of the spatula and a peripheral extremity of the spatula, said spatula being delimited by a first surface extending radially, and a second surface contiguous to the first surface extending circumferentially; said first surface being made of a hard resistant material.

\* \* \* \* \*